United States Patent [19]

Hassler et al.

[11] Patent Number: 5,574,765
[45] Date of Patent: Nov. 12, 1996

[54] X-RAY DIAGNOSTICS INSTALLATION HAVING A SOLID-STATE CONVERTER

[75] Inventors: Dietrich Hassler, Uttenreuth; Martin Hoheisel, Erlangen, both of Germany

[73] Assignee: Siemens Aktiengesellschaft, Munich, Germany

[21] Appl. No.: 506,870

[22] Filed: Jul. 25, 1995

[30] Foreign Application Priority Data

Jul. 26, 1994 [DE] Germany ............... 44 26 451.8

[51] Int. Cl.$^6$ ................................... H05G 1/64
[52] U.S. Cl. ............................ 378/98.7; 378/98.8
[58] Field of Search ............................ 378/98.7, 98.8

[56] References Cited

U.S. PATENT DOCUMENTS

| | | |
|---|---|---|
| 5,194,736 | 3/1993 | Meulenbrugge et al. . |
| 5,331,165 | 7/1994 | Frame . |
| 5,331,166 | 7/1994 | Yamamoto et al. . |
| 5,388,138 | 2/1995 | Fuywara ............... 378/98.7 |
| 5,396,072 | 3/1995 | Schiebel et al. . |

FOREIGN PATENT DOCUMENTS

PS 21 35 205  7/1980  Germany .

*Primary Examiner*—Craig E. Church
*Attorney, Agent, or Firm*—Hill, Steadman & Simpson

[57] ABSTRACT

An x-ray diagnostics installation has a high-voltage generator for an x-ray tube for generating an x-ray beam, having a detector arranged in the x-ray beam for acquiring the x-ray dose, a control unit connected to the detector for the control of the high-voltage generator, and a solid-state image converter which also serves as the detector. The solid-state image converter has a semiconductor layer with light-sensitive pixel elements arranged in a matrix and an electrically non-conductive layer applied thereon, an electrode layer applied on the electrically non-conductive layer forming a capacitor with the pixel elements to which charge is supplied due to x-ray exposure and that is connected to the control unit for the acquisition of this charge corresponding to the x-ray dose.

9 Claims, 4 Drawing Sheets

5,574,765

X-RAY DIAGNOSTICS INSTALLATION HAVING A SOLID-STATE CONVERTER

BACKGROUND OF THE INVENTION

1. Field of the Invention

The invention is directed to an x-ray diagnostics installation of the type having a high-voltage generator for an x-ray tube for generating an x-ray beam, a detector arranged in the x-ray beam for acquiring the x-ray dose, a control unit supplied with a signal from the detector for controlling the high-voltage generator and an image converter.

2. Description of the Prior Art

German OS 21 35 205 discloses an x-ray diagnostics installation having an automatic exposure unit, whereby a characteristic representative of the ongoing x-ray dose is acquired during the emission of x-rays. The ongoing radiation can thereby be switched off after a prescribed dose value has been reached.

In such x-ray diagnostics installations having an x-ray image intensifier, it is known to arrange an air-filled ionization chamber in front of the x-ray image intensifier as an auxiliary component. The slight current between two electrode plates with a voltage thereacross is directly proportional to the incident, ionizing radiation. The dose is determined by integration. The measuring precision, however, is insufficient for fluoroscopic doses.

In an x-ray image converter, for example an a-Si:H x-ray image detector, the image information is only available some time after the end of the x-ray pulse because the image detector is fundamentally operated in a storing mode. A dose measurement is thus not possible during the current x-ray pulse but only some time after the end thereof.

SUMMARY OF THE INVENTION

An object of the present invention is to provide an x-ray diagnostics installation of the type initially cited wherein a simple, fast and reliable acquisition of the x-ray dose can be made without auxiliary components.

This object is achieved in an x-ray diagnostics installation having a solid-state image converter with a semiconductor layer with light-sensitive pixel elements arranged in a matrix, and an electrically non-conductive layer applied thereon on which an electrode layer is applied as a detector, thereby forming a capacitor with the pixel elements to which charge arising due to exposure to x-rays is supplied. The solid-state image converter is connected to the control unit for supplying a signal thereto corresponding to the x-ray dose.

It has proven advantageous to employ an a-Si:H detector as the solid-state image converter. Dependent on the arrangement of the electrodes, the electrically nonconductive layer can be composed of a scintillator material or of glass.

A variation of the area covered is possible in an embodiment wherein the electrode layer is composed of a number of discrete electrodes that each overlap a number of pixels. An arbitrary dominant area can be selected by actuation of switches with which the discrete electrodes can be connected to a measuring amplifier of the control unit. The electrode layer can be composed of copper or of a light metal. A simple connection and selection of dominants can be achieved when the discrete electrodes have the shape of the desired, possible dominants. It has proven advantageous for the control unit to acquire and integrate the charge current.

DESCRIPTION OF THE PREFERRED EMBODIMENTS

Figure 1:
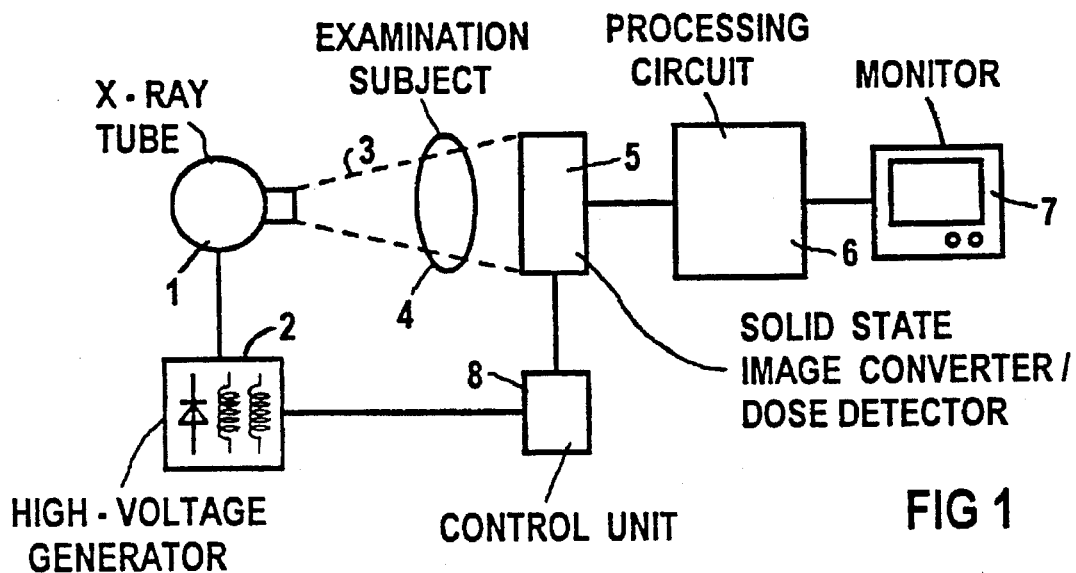
FIG. 1 is a schematic block diagram of an x-ray diagnostics installation constructed in accordance with the principles of the present invention.

FIG. 1 shows an x-ray diagnostics installation of the type which is known (except for the structure of the image converter 5) having an x-ray tube 1 that is driven by a high-voltage generator 2. The x-ray tube 1 emits an x-ray beam 3 that penetrates a patient 4 and is incident on an x-ray image converter 5 as an x-ray image attenuated according to the transparency of the patient 4. The x-ray image converter 5 is connected to a playback means that can be composed of a processing circuit 6 and a monitor 7 connected thereto for the playback of the x-ray image. In a known way, the processing circuit 6 can include a calculating circuit, filter circuits, image memories and transducers or converters, which are not shown.

A control unit that is connected to the high-voltage generator 2 for controlling the x-ray dose is connected to the x-ray image converter 5.

Figure 2:
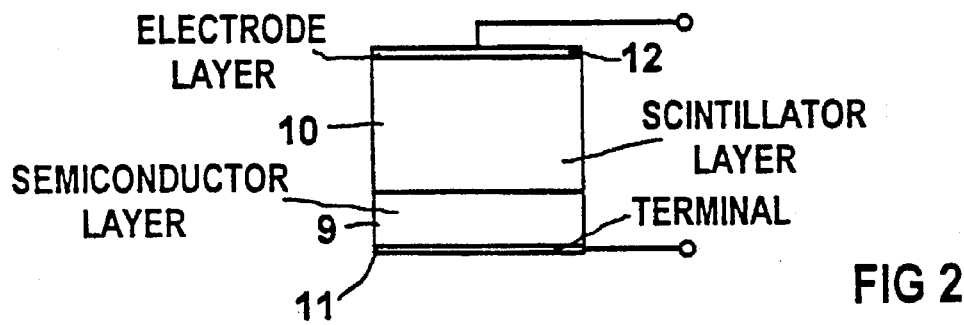
FIG. 2. is a side view of a first embodiment of an x-ray image converter constructed in accordance with the principles of the present invention, for use in the x-ray diagnostics installation of FIG. 1.

FIG. 2 shows a cross-section through the x-ray image converter 5. The x-ray image converter 5 has a semiconductor layer 9 onto which a scintillator layer 10 is applied. The semiconductor layer 9 is provided with a terminal 11. An electrode layer 12 that lies opposite the semiconductor layer 9 is arranged on the scintillator layer 10 instead of, or under, a bottom-insulated aluminum layer (not shown). The terminal 11 and the electrode layer 12 serve as the detector for the x-radiation. In this x-ray image converter, the electrode layer 12 is arranged above the semiconductor layer 9.

Figure 3:
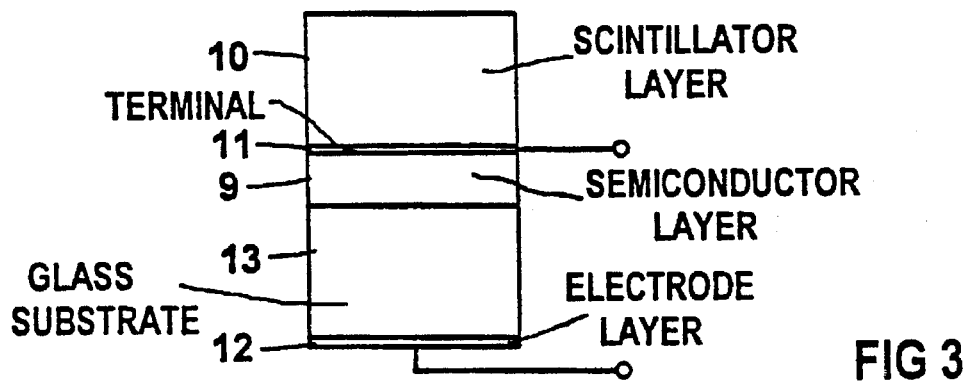
FIG. 3 is a side view of a second embodiment of an x-ray image converter constructed in accordance with the principles of the present invention for use in the x-ray diagnostics installation of FIG. 1.

FIG. 3 shows another embodiment of the inventive x-ray image converter 5, whereby the electrode layer 12 is located under the semiconductor layer 9. The semiconductor layer 9 is applied on a glass substrate 13, with the sensitive electrodes of the photodiodes of the individual pixel elements lying on the glass substrate 13. An optically transparent electrode layer 12 is applied on the back side of the glass substrate 13, the side opposite the semiconductor layer 9. The terminal 11 that is covered by the scintillator layer 10 is located on the semiconductor layer 9. The charge arising between the semiconductor layer 9 and the glass substrate 13 can be acquired via the terminal 11 and the electrode layer 12.

Both embodiments generate an output current arising due to charge generation caused by incident x-rays, the current being representative of the x-ray dose. The electrode layer 12 is applied onto an electrically non-conductive layer and faces toward the so-called "hot" electrode. Dependent on the pixel format, the arrangement of the electrode layer 12 can be either on the substrate 13 or on the scintillator layer 10.

The semiconductor layer 9 can be composed of hydrogen-doped, amorphous silicon (aSi:H), and is composed of a multitude of individual picture elements, or pixel elements that can be photodiodes.

During the x-ray pulse, the charge of the photodiodes of the pixel elements changes very rapidly. For acquiring the macroscopic changes in a larger area that constitutes the area of a number of photodiodes, a measurement of the received radiation over this area can be achieved by capacitive coupling.

Figure 4:
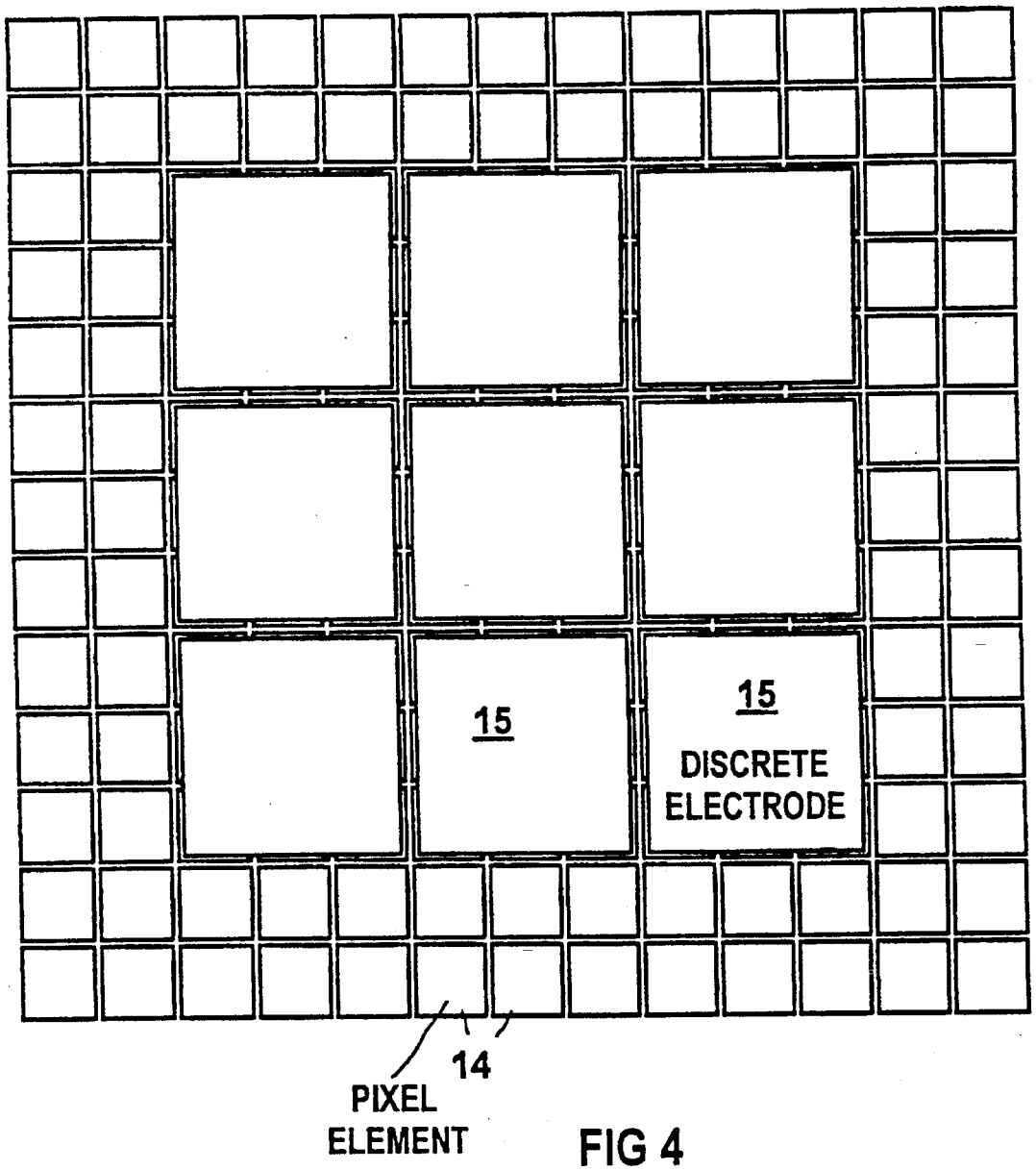
FIG. 4 is a plan view showing the arrangement of discrete electrodes on an x-ray image converter constructed in accordance with the principles of the present invention.

This is achieved by the embodiment shown in FIG. 4. The electrode layer 12 composed of n ×n discrete electrodes 15 is applied on the scintillator layer 10 arranged over the semiconductor layer 9 with m ×m pixel elements, whereby the individual electrodes 15 each cover a number of pixel elements 14. As shown, the edge area can remain free since no relevant irradiation that would have to be acquired is present in this area. For simplicity, FIG. 4 only shows nine discrete electrodes 15 that each overlap nine pixel elements 14. The actual number of overlapped pixel elements 14 as well as the total number of pixel elements 14 and of discrete electrodes 15 as well as the number of pixel elements 14 covered by all of the individual electrodes 15 is significantly greater.

These discrete electrodes 15 cover an area of, for example, 2×2 cm, and have a capacitance relative to the sensitive electrodes of the photodiodes. During the x-ray pulse, the voltage at the active electrode drops linearly to the zero charge of the photodiode dependent on the brightness of the light emitted by the scintillator layer 10. This voltage drop changes with the charge of the sensor capacitance and can be measured at the electrode layer 12 in various ways.

The thin electrode layer 12, which can be composed of copper or light metal, exhibits only slight absorption that in fact effects no dose modifications, but which could potentially be visible in the x-ray image as a pattern. The images of the contours of the discrete electrodes 15 are eliminated after a gain correction. The measurement should remain limited to the time window for x-ray application in order to avoid disturbances.

A number of discrete electrodes 15 can be interconnected in order to obtain the desired dominant region. As described below, this interconnection can be achieved before or after the charge measurement.

Figure 5:
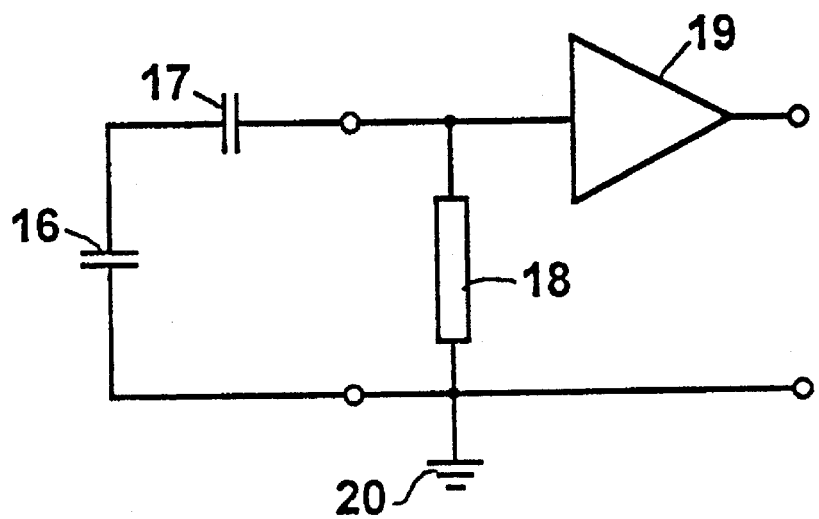
FIGS. 5, 6 and 7 are respective circuit diagrams for three embodiments for measured value acquisition of the charge obtained in the x-ray image converter constructed in accordance with the principles of the present invention.

FIG. 5 shows a circuit for illustrating the measurement. The photodiodes of the pixel elements 14 in combination have a pixel capacitance represented by capacitor 16, connected in series with the capacitance of the capacitors of the discrete electrodes 15, represented by capacitor 17. The applied dose can be detected with a resistor 18 that converts the charge current of the film capacitor 17 into a voltage that is acquired by an amplifier 19. The resistor 18 is applied to ground 20 at one side. The test voltage corresponding to the x-ray dose and from whose increase a signal can be obtained for the control of the high-voltage generator 2, can be taken at the output of the amplifier 19 with respect to opposite ground 20.

Figure 6:
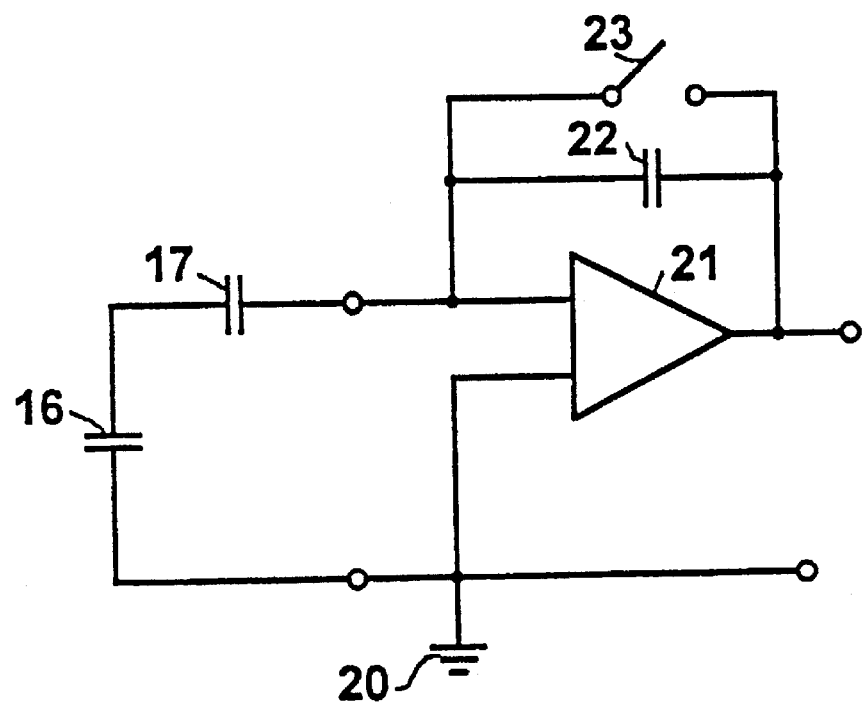

The diode voltage can also be measured with a charge amplifier, shown in FIG. 6. The charge transfer through the film capacitor 17 is converted into a voltage drop across a capacitor 22 that effects a capacitive feedback of an operational amplifier 21. A switch 23 serves for resetting of the capacitor 22 (if needed) and allows the measurement within an x-ray window. This measuring procedure has two advantages. The slight coupling between the picture elements that is produced by the sensor electrodes is additionally reduced by the clamping to ground 20 with the operational amplifier 21. The capacitance of a possible grounded layer arranged above the electrode layer 12 does not reduce the sensitivity of the detector.

The present invention is based on the recognition that all photodiodes of the detector are more or less completely discharged dependent on the dose by a charge voltage of, for example, 2 V during the x-ray pulse, which has a duration of a few milliseconds through a few seconds. Since one of the electrodes of these diodes lies at virtual grounded potential, the other, so-called "hot" electrode is locked in. When an insulated sensor electrode is placed opposite some of or all the diodes with varying potential as a capacitor plate, then the variation of the potential of the photodiodes can be taken at the sensor electrodes on the basis of the charge shift. The change in voltage at the photodiodes is thus a direct indication of the applied x-ray dose. The information can be taken at the sensor plates as a change in voltage. Together with the input impedance of the tapping electronics, the capacitance of the sensor plate relative to the diodes must then form a high-pass that still allows the lowest frequency component of the time signal to pass.

Given a cut-off frequency of the aforementioned highpass filter that is extremely high, the charge shift can also be measured as current in the input resistor and an indication of the dose rate is obtained, so that integration merely must then be carried out. Measurement is only undertaken during the x-ray pulse.

The sensor electrode can be at a relatively large distance from the diode electrodes, for example on the scintillator (0.4 mm thick), so that no noticeable coupling of the pixel elements 14 to one another arises due to the individual electrodes 15.

The electrode layer 12 can be versatilely subdivided, so that measuring fields, referred to as dominants, can be approximated with a differing selection of sub-areas with switches. The electrical field lines extend only relatively slightly laterally when the electrode area is large in comparison to the plate spacing —scintillator thickness, 0.4 mm. Given only one metallization level, the leads must run in part between the sub-electrodes or they can be laid independently thereof when two levels are available.

Figure 7:
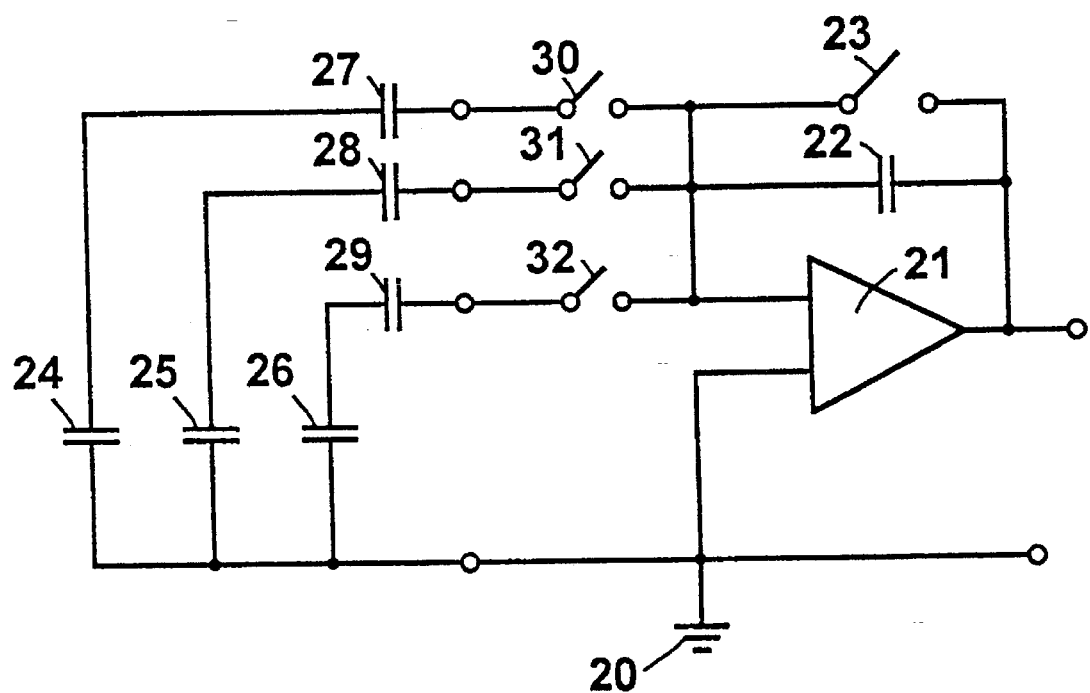

FIG. 7 shows a circuit arrangement for implementing this measuring technique, whereby a number of measuring fields can be optionally covered individually or in combination. The pixel elements 14 lying under the discrete electrodes 15 of FIG. 4 have respective pixel capacitances represented by capacitors 24 through 26.

These pixel capacitors 24 through 26 are connected in series with the film capacitors 27 through 29. For simplification, only three branches corresponding to three discrete electrodes 15 are shown in FIG. 7. Given the structure shown in FIG. 4, however, nine corresponding branches would have to be provided.

The respective discrete electrodes 15 that are required can be selected via selection switches 30 through 32 which cause a selected electrode 15 to be connected to the operational amplifier 21, so that an arbitrary dominant can be selected. In the case of the structure shown in FIG. 4, for example, the middle discrete electrode 15, the middle row or column of discrete electrodes 15, a cross formed of the middle rows and columns of discrete electrodes 15 or one of the diagonals combined or even all discrete electrodes 15 can thus be interrogated. The shape of the electrodes can be arbitrary and is not limited to a rectangle or square. The switches which determine the shape (such as switches 30–32) are actuated by instructions entered through a suitable input unit (not shown) by an operator.

As a result of this inventive structure and this measuring arrangement, an x-ray diagnostics installation with an x-ray image converter is obtained wherein no loss of dose due to additional components arranged in front of the x-ray image converter arises and with which a simple and fast acquisition of the x-ray dose can ensue, so that the highvoltage generator 2 can be reliably shut off at any desired, predetermined dose values.

No correction calculations are needed for different x-ray energy spectra, as would be necessary with the ionization chamber, because image exposure is directly measured.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnostics installation comprising:

a high-voltage generator;

an x-ray tube, supplied by said high-voltage generator, which emits an x-ray beam;

a solid-state image converter on which said x-ray beam is incident for converting an x-ray image of an examination subject disposed in said x-ray beam into electrical video signals and for separately generating a dose rate signal corresponding to an x-ray dose of said x-ray tube, said solid-state image converter including a semiconductor layer with a plurality of light-sensitive pixel elements arranged in a matrix for generating said video signals, an electrically non-conductive layer disposed on said semiconductor layer, and an electrode layer disposed on said non-conducting layer forming a capacitor with said pixel elements to which charge is supplied due to x-rays incident on said solid-state image converter for generating said dose rate signal corresponding to the x-ray dose rate exclusively of said video signals;

means supplied with said video signals from said solid-state image converter for generating a video image corresponding to said x-ray image; and control means, supplied with said dose signal corresponding to said x-ray dose rate, for controlling said high-voltage generator dependent on an x-ray dose derived from said dose rate.

2. An x-ray diagnostics installation as claimed in claim wherein said electrically non-conductive layer comprises scintillator material.

3. An x-ray diagnostics installation as claimed in claim 1 wherein said electrically non-conductive layer comprises glass.

4. An x-ray diagnostics installation as claimed in claim 1 wherein said electrode layer comprises a plurality of discrete electrodes, each of said discrete electrodes overlapping a number of said pixel elements.

5. An x-ray diagnostics installation as claimed in claim 4 wherein said control unit includes a measuring amplifier and said x-ray diagnostics installation further comprising a plurality of switches respectively connected between said discrete electrodes and an input of said measuring amplifier for connecting selected discrete electrodes to said input of said measuring amplifier.

6. An x-ray diagnostics installation as claimed in claim 1 wherein said electrode layer comprises copper.

7. An x-ray diagnostics installation as claimed in claim 1 wherein said electrode layer comprises a light metal.

8. An x-ray diagnostics installation as claimed in claim 1 wherein said electrode layer comprises a plurality of discrete electrodes, each overlapping a number of pixel elements, said discrete electrodes being selectively shaped for producing a dominant of said x-ray image in said video image.

9. An x-ray diagnostics installation as claimed in claim 1 wherein said control means comprises means for integrating said signal corresponding to the x-ray dose rate to derive said x-ray dose.

\* \* \* \* \*